United States Patent

Hayashi et al.

[11] Patent Number: 6,075,578
[45] Date of Patent: Jun. 13, 2000

[54] SIGNAL ELECTRODES FOR PLASMA ADDRESSED DISPLAY SYSTEM

[75] Inventors: Masatake Hayashi; Jun Iwama; Tomoaki Kichimi, all of Gifu, Japan

[73] Assignee: Sony Corporation, Tokyo, Japan

[21] Appl. No.: 09/095,042

[22] Filed: Jun. 10, 1998

[30] Foreign Application Priority Data

Jun. 10, 1997 [JP] Japan ................................. 9-168054

[51] Int. Cl.⁷ .................................................. G02F 1/133
[52] U.S. Cl. ........................ 349/32; 315/169.4; 313/518; 313/587
[58] Field of Search ............................. 349/32; 313/587, 313/518; 315/169.4

[56] References Cited

U.S. PATENT DOCUMENTS

| | | |
|---|---|---|
| 5,525,862 | 6/1996 | Miyazaki . |
| 5,747,932 | 5/1998 | Hayashi et al. ............................ 349/32 |
| 5,800,232 | 9/1998 | Miyazaki ................................. 349/32 |

FOREIGN PATENT DOCUMENTS

0 762 373   3/1997   European Pat. Off. .

Primary Examiner—William L. Sikes
Assistant Examiner—James A. Dudek
Attorney, Agent, or Firm—Hill & Simpson

[57] ABSTRACT

A plasma addressed display system with a flat panel structure comprising a display cell for displaying an image through modulation of incident light in accordance with an image signal, and a plasma cell joined to the display cell for scanning the same. The plasma cell has discharge channels arrayed in rows and generates discharges in succession to scan the display cell line sequentially. The display cell has signal electrodes arrayed in columns, and forms pixels at intersections with the discharge channels. The display cell applies an image signal in synchronism with the line sequential scanning and modulates the incident light per pixel. Pixels of two rows are defined in the discharge channel of one row. The intersections of the signal electrodes and the discharge channels are partially shielded from light with a mask in a predetermined pattern, while the remaining unmasked light transmitting portions are assigned to the pixels 11 of either row, and the image signal is applied simultaneously to the pixels of two rows by the discharge generated in the discharge channel of one row. In this system, an enhanced resolution is achieved without harmfully affecting the aperture ratio or the electric resistance of signal electrodes.

10 Claims, 10 Drawing Sheets

SIGNAL ELECTRODES FOR PLASMA ADDRESSED DISPLAY SYSTEM

BACKGROUND OF THE INVENTION

1. Field of the Invention

The present invention relates to a plasma addressed display system having a flat panel structure where a display cell and a plasma cell are mutually superposed, and more particularly to technology for realizing an enhanced resolution of pixels formed in such a plasma addressed display system.

2. Description of the Related Art

Figure 7:
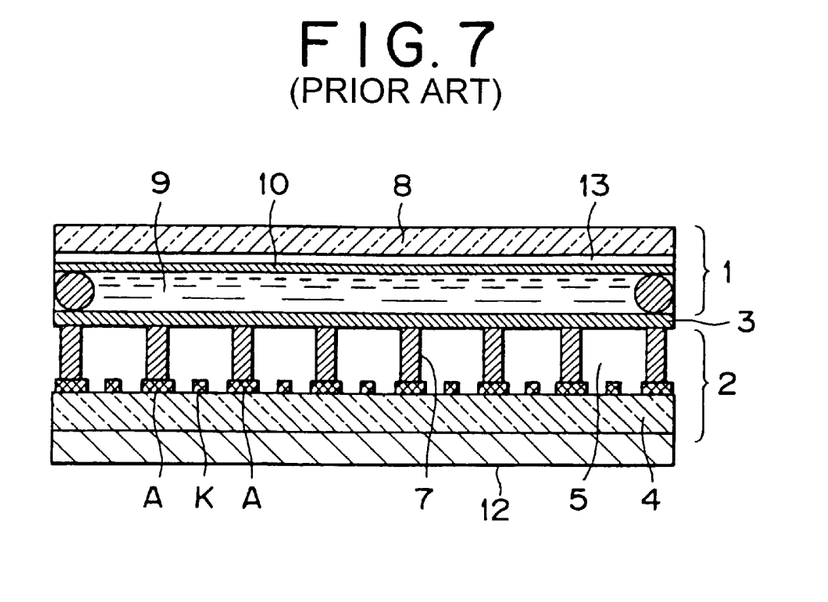
FIG. 7 is a sectional view showing an example of a ordinary plasma addressed display system.

FIG. 7 shows the structure of an exemplary plasma addressed display system disclosed in Japanese Patent Laid-open No. Hei 4 (1992)-265931. As shown in this diagram, the plasma addressed display system has a flat panel structure consisting of a electro-optical display cell 1, a plasma cell 2 and a common intermediate sheet 3 interposed therebetween. The intermediate sheet 3 is composed of extremely thin sheet glass or the like and is termed a micro sheet. The plasma cell 2 is composed of a lower glass substrate 4 joined to the intermediate sheet 3, and an ionizable gas is enclosed in the gap therebetween. Striped discharge electrodes A and K are formed on the inner surface of the lower glass substrate 4. The discharge electrodes function alternately as anodes A and cathodes K. Since the discharge electrodes are formable by printing and baking on the flat glass substrate 4 by a screen printing process or the like, there are achieved superior productivity and working efficiency. Barrier ribs 7 are formed along each anode A of the discharge electrodes immediately above the anode and and which divides the gap where an ionizable gas is enclosed, thereby forming discharge channels 5. The barrier ribs 7 also are formed by printing and baking by a screen printing process, and the top of the rib is kept in contact with one surface of the intermediate sheet 3. A plasma discharge is generated between each of the anodes A on both sides and the intermediate cathodes K within the discharge channels 5 defined by pairs of the barrier ribs 7. The intermediate sheet 3 and the lower glass substrate 4 are joined to each other with glass frit or the like.

The electro-optical display cell 1 is composed of a transparent upper glass substrate 8. This glass substrate 8 is bonded to the other surface of the intermediate sheet 3 spaced by a predetermined gap with a sealing material or the like, and a liquid crystal 9 is enclosed as an electro-optical substance in this gap. Signal electrodes 10 are formed on the inner surface of the upper glass substrate 8. Matrix pixels are formed at intersections of the signal electrodes 10 and the discharge channels 5. A color filter 13 is also provided on the inner surface of the glass substrate 8, and three primary colors R, G, B for example are allocated to the pixels. The flat panel structure of such constitution is a light transmission type where, for example, the plasma cell 2 is positioned on the incident side while the display cell 1 is positioned on the outgoing side. A back light 12 is attached to the plasma cell 2 side of the display.

In the plasma addressed display system of the type mentioned, the row discharge channels 5, where plasma discharges are generated, are scanned line sequentially, and display driving is executed in synchronism with such scanning by applying an image signal to the column signal electrodes 10 on the display cell 1 side of the display. Upon generation of a plasma discharge in the discharge channel 5, the inside of the channel is brought substantially uniformly to an anode potential, and rows of pixels are thus selected.

That is, the discharge channel functions as a sampling switch. When the image signal is applied to the pixels in an on-state of the plasma sampling switch, sampling is performed to thereby control turn-on or turn-off of the pixels. Even after the plasma sampling switch is turned to its off-state, the image signal is held as it is in the pixel. More specifically, in response to the image signal, the display cell 1 modulates the incident light received from the back light 12 into outgoing light and then displays the image.

Figure 8:
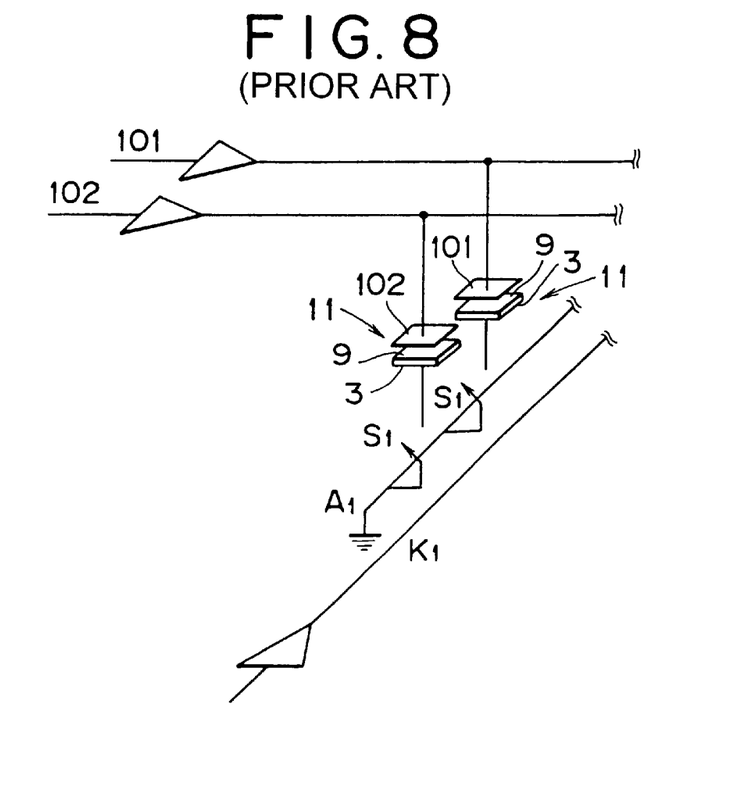
FIG. 8 typically illustrates the operation performed in the ordinary system of FIG. 7.

FIG. 8 is a typical diagram illustrating two pixels extracted from a display unit. In this diagram, only two signal electrodes 101 and 102, one cathode K1 and one anode A1 are shown to facilitate understanding of the invention. Each pixel 11 has a layered structure consisting of signal electrodes 101, 102, a liquid crystal 9, an intermediate sheet 3 and a discharge channel. During a plasma discharge, the discharge channel is substantially hold at the anode potential. When an image signal is applied to the signal electrodes 101 and 102 in this state, an electric charge is injected into the liquid crystal 9 and the intermediate sheet 3. Upon termination of the plasma discharge, the discharge channel is returned to its insulated state to consequently have a floating potential, whereby the injected charge is held in each pixel 11. That is, a sampling and holding action is performed. Since the discharge channel thus functions as an individual sampling switching element provided in each pixel 11, it is typically expressed by the use of a switching symbol S1. On the other hand, the liquid crystal 9 and the intermediate sheet 3 held between the signal electrodes 101, 102 and the discharge channel function as a sampling capacitor. When the sampling switch S1 is turned on by line sequential scanning, the image signal is held in the sampling capacitor, and each pixel is switched on or off in accordance with the signal voltage level. Even after the sampling switch S1 is turned off, the signal voltage is held in the sampling capacitor, and an active matrixing operation is performed in the display system. An effective voltage applied actually to the liquid crystal 9 is determined by division of the capacitance to the intermediate sheet 3.

In the plasma addressed display system having the structure mentioned above, it is necessary, for raising the resolution thereof, to achieve a higher density of pixels arrayed in rows and columns. Each pixel can be horizontally miniaturized by reducing the line width of each signal electrode, while each pixel can be vertically miniaturized by decreasing the array pitch of the discharge channels. However, since the individual discharge channels are partitioned by barrier ribs, it is technically difficult to significantly reduce the thickness of the barrier ribs, and the minimum thickness is determined to provide a required mechanical strength and so forth. Therefore, if the array pitch of discharge channels is decreased, the thickness of the barrier ribs occupies a greater portion of the display which results in a problem that the area of each opening for actual transmission of light is reduced. In other words, the aperture ratio of the panel is diminished in proportion to an increase of the number of discharge channels, i.e., the number of scans.

Figure 9:
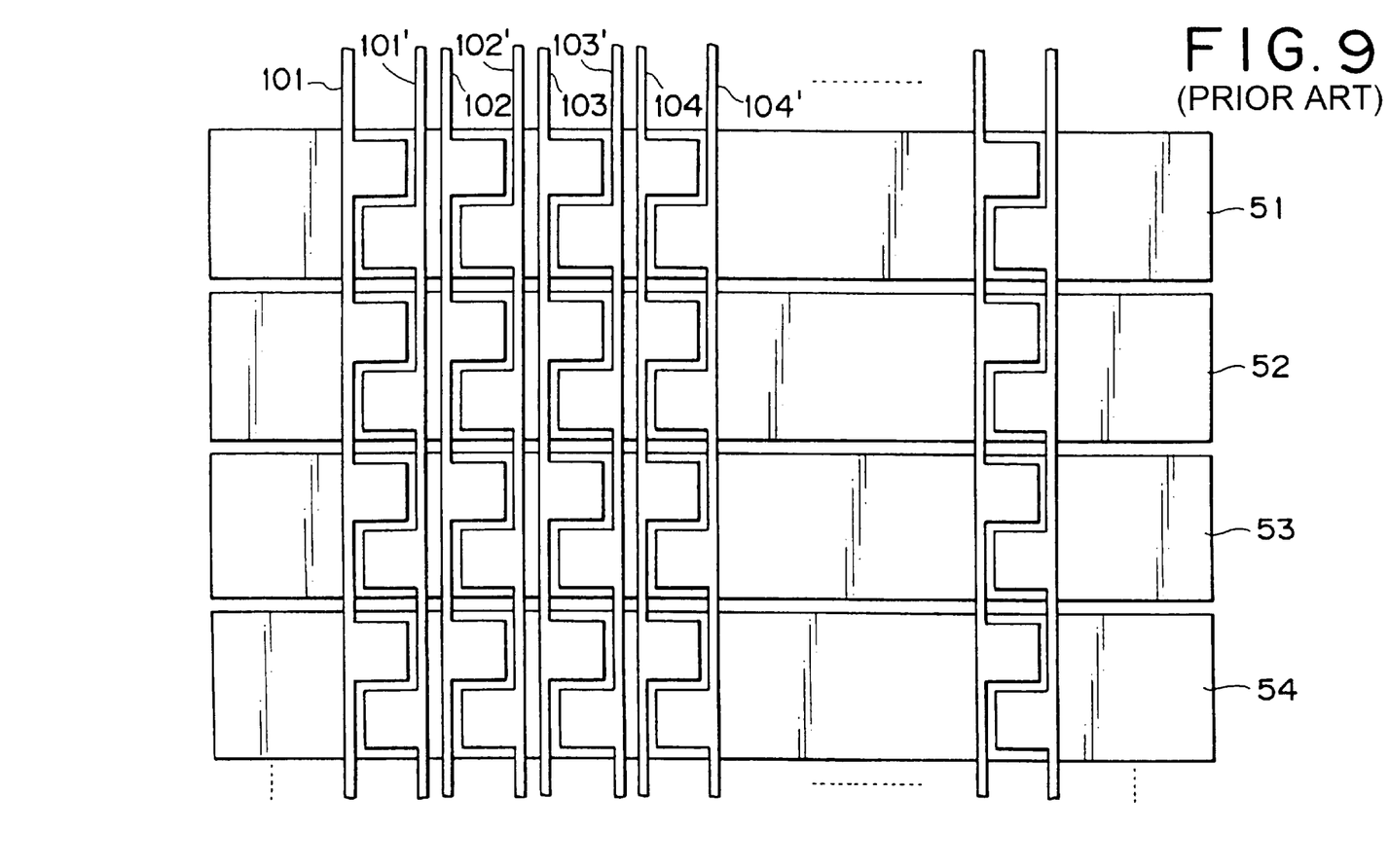
FIG. 9 is a plan view showing another example of a ordinary plasma addressed display system.

A measure for coping with the above problem is disclosed in Japanese Patent Laid-open No. Hei 4 (1992)-265933, which is shown in FIG. 9. As shown in this diagram, column signal electrodes 101, 101', 102, 102', . . . intersect with row discharge channels 51, 52, 53, 54, . . . , and pixels are provided at the intersections. The signal electrodes are so patterned as to be divided into upper and lower portions at the intersections. More specifically, the signal electrodes have a double matrix structure which consists of signal electrodes 101, 102, 103, 104, . . . corresponding to the upper halves of the discharge channels 51–54 and signal electrodes 101', 102', 103', 104', . . . corresponding to the lower halves of the discharge channels 51–54. In this manner, the signal electrodes arrayed orthogonally to the discharge channels 51–54 are multi-matrixed through division into a plurality per scanning unit. More precisely, the signal electrodes are double-matrixed in a form divided into upper and lower parts in a single discharge channel, so that the operation performed therein is equivalent to that in a case where two pixel rows (two scanning lines) are existent in relation to a single discharge channel. Therefore, if the number of scanning lines is fixed, the array pitch of the discharge channels is reduced to a half to consequently facilitate the production process. However, for realizing simultaneous writing in pixels of plural rows relative to a single discharge channel, there are formed some portions where the signal line is rendered extremely thin, as shown in FIG. 9, due to the necessity of separating the signal electrodes. The signal voltage applied to the signal electrode is regulated to a time constant which is determined by the product of the electrode resistance and the pixel capacitance. If the resistance of the signal electrode becomes extremely high, it is impossible to perform satisfactory writing in the entire pixels included in one picture within the time of one frame of the displayed image.

Generally, for execution of a high resolution display by the use of an active matrix type color display system, it is necessary to increase the number of pixels on a screen. In this case, the size of each pixel is reduced, and the time allocated to writing is shortened. In a plasma addressed display system, the pixel size is determined by the array pitch of discharge channels and the width of each signal electrode. Since barrier ribs need to be formed for partitioning the discharge channels in a plasma addressed display system, the aperture ratio of the display panel is extremely lowered, due to the existence of such barrier ribs, in proportion to diminution of the display pitch. One of the means proposed for elimination of the above problem is to write an image signal of plural scanning lines in one discharge channel as described. According to this means, discharge channels are formed at an array pitch corresponding to a plurality of scanning lines subjected to simultaneous writing, and the image signal stored in a line memory is written simultaneously by plasma discharges in one discharge channel. However, this means is also flowed since the signal electrode in each pixel needs to be divided into a plurality of electrodes. As a result, the resistance of the signal electrode is increased. As a result, the waveform of the voltage applied to the signal electrode is rounded off so that the predetermined signal voltage level fails to be applied to the signal electrode.

SUMMARY OF THE INVENTION

It is an object of the present invention to provide a plasma addressed display system which is capable of realizing high resolution display while minimizing reduction of the aperture ratio and increasing of the signal electrode resistance.

According to an aspect of the present invention, there is provided a plasma addressed display system having a flat panel structure which comprises a display cell for displaying an image through modulation of incident light into outgoing light in accordance with an image signal, and a plasma cell joined to the display cell through respective planes to scan the same. The plasma cell has discharge channels arrayed in rows and generates discharges in succession to scan the display cell line sequentially. The display cell has signal electrodes arrayed substantially in columns and forms pixels at intersections with the discharge channels. The display cell serves to apply an image signal in synchronism with the line sequential scanning and executes modulation of the incident light per pixel. In this display system, the characteristic of the invention resides in that pixels of plural rows are defined in the discharge channel of one row, and the intersections of the signal electrodes and the discharge channels are partially masked in conformity with a predetermined pattern, while the unmasked portions left in the intersections are assigned to the pixels of either row, and the image signal is applied simultaneously to the pixels of plural rows by the discharge generated in the discharge channel of one row.

Preferably, the predetermined pattern is a lattice pattern in which the masked light shielding portions and the remaining unmasked light transmitting portions to be used as pixels are arranged in a checked form. Also preferably, each of the signal electrodes may be so shaped that the line width of the masked light shielding portion is narrowed to a certain extent not raising any problem relative to the wiring resistance, while the line width of the unmasked light transmitting portion is widened correspondingly thereto. Further preferably, each of the discharge channels has a pair of barrier ribs forming a row space, an anode electrode disposed under each barrier rib, and a cathode electrode disposed between the anode electrodes on both sides in the space. The pixels of one row are defined between one barrier rib and the cathode electrode, while the pixels of the other row are defined between the other barrier rib and the cathode electrode. And further preferably, an image processing means is provided for previously filtering the image signal two dimensionally so as to adapt the image signal to the predetermined pattern.

In the plasma addressed display system of the present invention, substantially striped signal electrodes are partially masked in the discharge channels in such a manner that pixels are arrayed in a checked pattern for example, whereby pixels of two rows (two scanning lines) are provided in each discharge channel. Consequently, the pixels can be provided at a higher density to realize an enhanced resolution without sacrificing the aperture ratio or the electric resistance of the signal electrodes.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to the accompanying drawings.

Figure 1A:
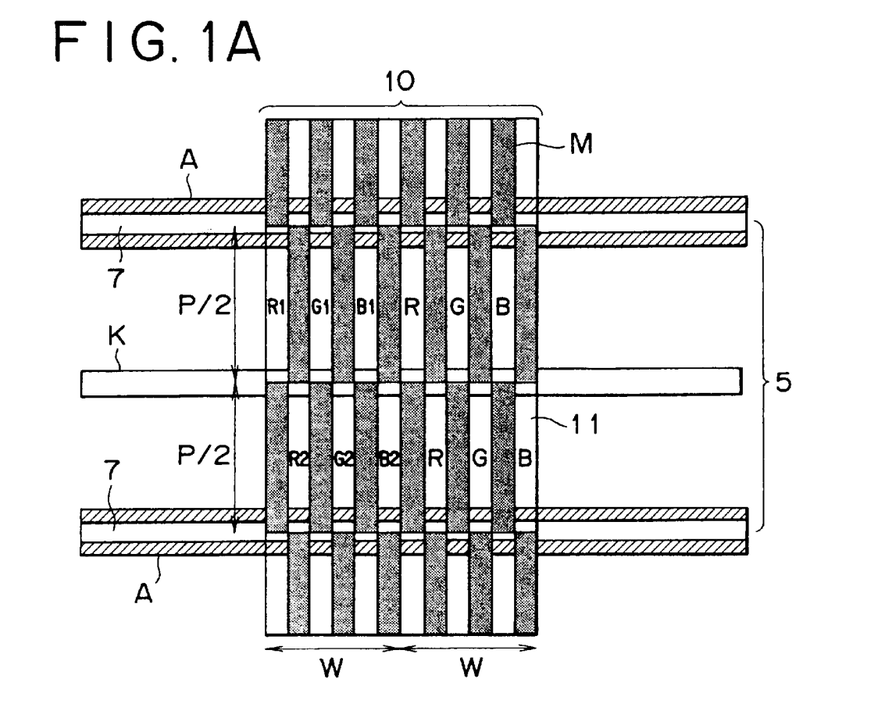
FIGS. 1A and 1B are a partial plan view and a partial sectional view, respectively, of an embodiment representing a plasma addressed display system of the present invention.
Figure 1B:
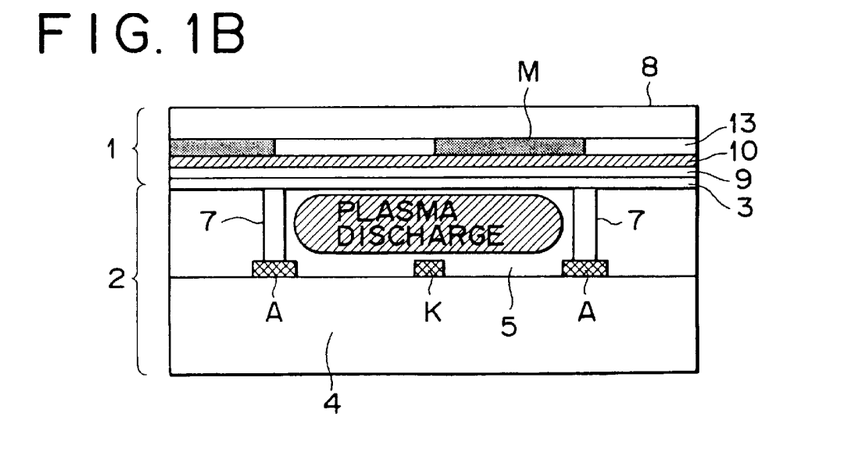

FIGS. 1A and 1B typically show an exemplary embodiment representing the plasma addressed display system of the present invention, in which FIG. 1A is a partial plan view, and FIG. 1B is a partial sectional view. As shown in FIG. 1B, the plasma addressed display system has a flat panel structure comprising a display cell 1 for displaying an image through modulation of incident light into outgoing light in accordance with an image signal, and a plasma cell 2 joined to the display cell 1 in respective planes to scan the display. The plasma cell 2 has discharge channels 5 arrayed in rows and generates plasma discharges in succession to scan the display cell 1 line sequentially. Each discharge channel 5 comprises a pair of barrier ribs 7 to form a row space, anode electrodes A disposed under lower portions of the barrier ribs, and a cathode electrode K disposed between the anode electrodes A on both sides in the space. On the other hand, the display cell 1 has signal electrodes 10 arrayed in columns to form pixels at intersections with the discharge channel 5, and applies an image signal synchronously with the line sequential scanning to modulate the incident light per pixel. The display cell 1 and the plasma cell 2 are joined to each other by an intermediate sheet 3. The plasma cell 2 is composed of a substrate 4 joined to the intermediate sheet 3 from below, while the display cell 1 is composed of a substrate 8 joined to the intermediate sheet 3 from above. A liquid crystal material 9 is held as an electro-optical substance between the substrate 8 and the intermediate sheet 3. A color filter 13 is formed on the inner surface of the substrate 8, and three primary colors R, G, B are allocated to the pixels. A mask M of a predetermined pattern is formed on the color filter 13.

In this embodiment, as shown in FIG. 1A, pixels 11 of plural rows are provided in the discharge channel 5 of one row. For this purpose, intersections of signal electrodes 10 and the discharge channel 5 are partially shielded from light with the mask M in conformity with a predetermined pattern, and the remaining unmasked portions in the intersections are assigned to the pixels 11 of either row. Due to such a construction, an image signal can be applied simultaneously to pixels 11 of plural rows by the plasma discharge from the discharge channel 5 of one row. In this embodiment, pixels 11 of one row are provided between one barrier rib 7 and the cathode electrode K, while pixels 11 of the other row are provided between the other barrier rib 7 and the cathode electrode K. In the predetermined pattern, the masked light shielding portions and the unmasked light transmitting portions to be used as pixels 11 are arranged like a checked lattice pattern. Preferably, in the signal electrode, the line width of the masked light shielding portion may be small to a certain extent so as to not raise any problem relative to the wiring resistance, while the line width of the unmasked light transmitting portion may be large correspondingly thereto.

FIG. 1A shows pixels R1, G1, B1 belonging to the upper row and pixels R2, G2, B2 belonging to the lower row. A set of pixels R1, G1, B1 constitute a display unit. Hereinafter such a display unit will be termed "pixel trio" in this specification. As obvious from the diagram, a pixel trio (R1, G1, B1) has a dimension of P/2 vertically and a dimension of W horizontally. The reference character P is an array pitch of discharge channels 5. The other pixel trio (R2, G2, B2) also has a vertical dimension of P/2 and a horizontal dimension of W. Thus, according to the present invention, the vertical size of each pixel trio is reduced to a half of the array pitch P of the discharge channels 5 to consequently achieve the desired miniaturization.

According to the present invention, a mask M is patterned on a striped color filter 13 used generally in a color display system, in a manner to halve the stripes of the color filter corresponding to the signal electrodes 10 in one discharge channel 5, as shown in FIG. 1A. Therefore, it becomes possible to provide two pixel rows vertically in one single discharge channel 5. Simultaneous writing is performed in two pixel rows. Due to such a structure, the number of barrier ribs 7 needed to form discharge channels 5 used as plasma switching elements can be reduced to a half, hence raising the aperture ratio of its panel. As a result, it becomes possible to enhance the display brightness and to lower the power consumption by a back light. Further owing to such halved number of discharge channels 5, the switching frequency of the discharge channels in each frame period can also be reduced to eventually prolong the writing time required per scanning line, thereby diminishing the task of a driving circuit on the discharge channel side or the signal electrode side as well as decreasing the load to the switching speed of the discharge channels.

Figure 2A:
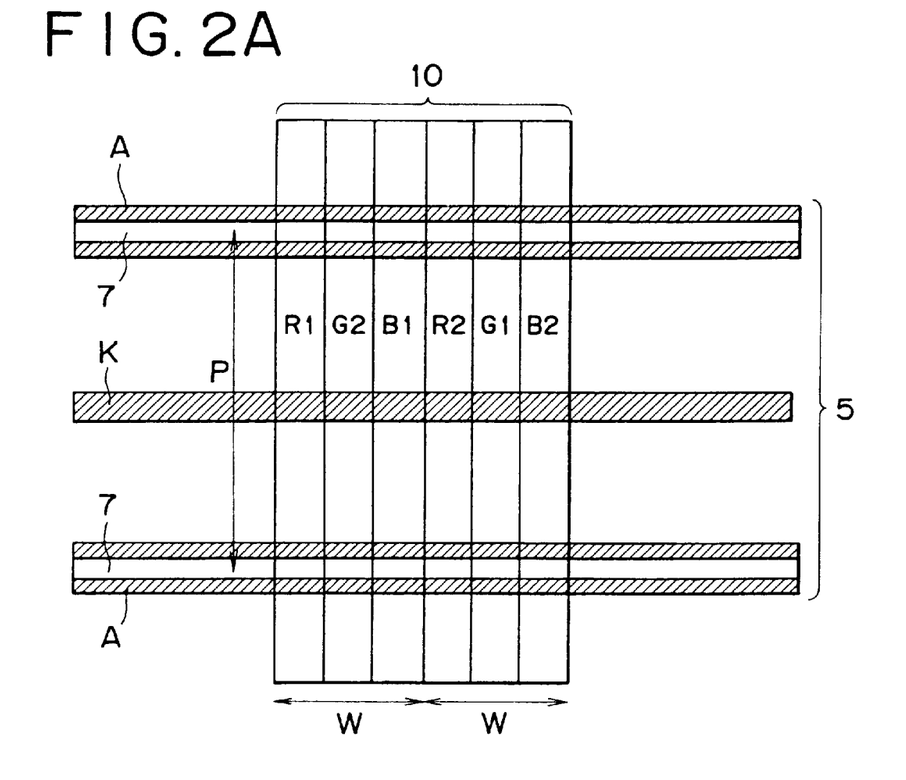
FIGS. 2A and 2B are a partial plan view and a partial sectional view, respectively, of a reference example relative to a plasma addressed display system.
Figure 2B:
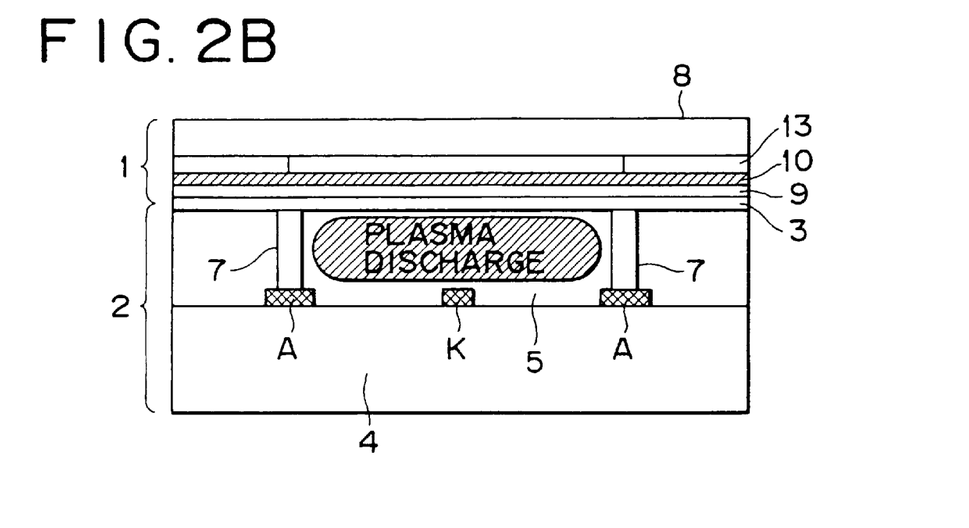

FIGS. 2A and 2B show a reference example of a plasma addressed display system, in which FIG. 2A is a partial plan view, and FIG. 2B is a partial sectional view. Fundamentally this reference example is similar to the aforementioned embodiment shown in FIG. 1, and any system components corresponding to those mentioned above are denoted by like reference numerals so as to be understood with facility. The difference resides in the point that no mask is formed on the color filter 13. In this case, the vertical dimension of a pixel trio (R1, G2, B1) is P equal to the array pitch of the discharge channels 5, and the horizontal dimension thereof is W. Similarly, the other pixel trio (R2, G1, B2) has a vertical dimension P and a horizontal dimension W. As is obvious from a comparison between FIGS. 1 and 2, the vertical dimension of each pixel trio in the embodiment is a half of that in the reference example. However, the line width of the signal electrode 10 in the embodiment is a half of that in the reference example. Technically, the line width can be narrowed with relative ease and no problem is presented in the production process.

Figure 3A:
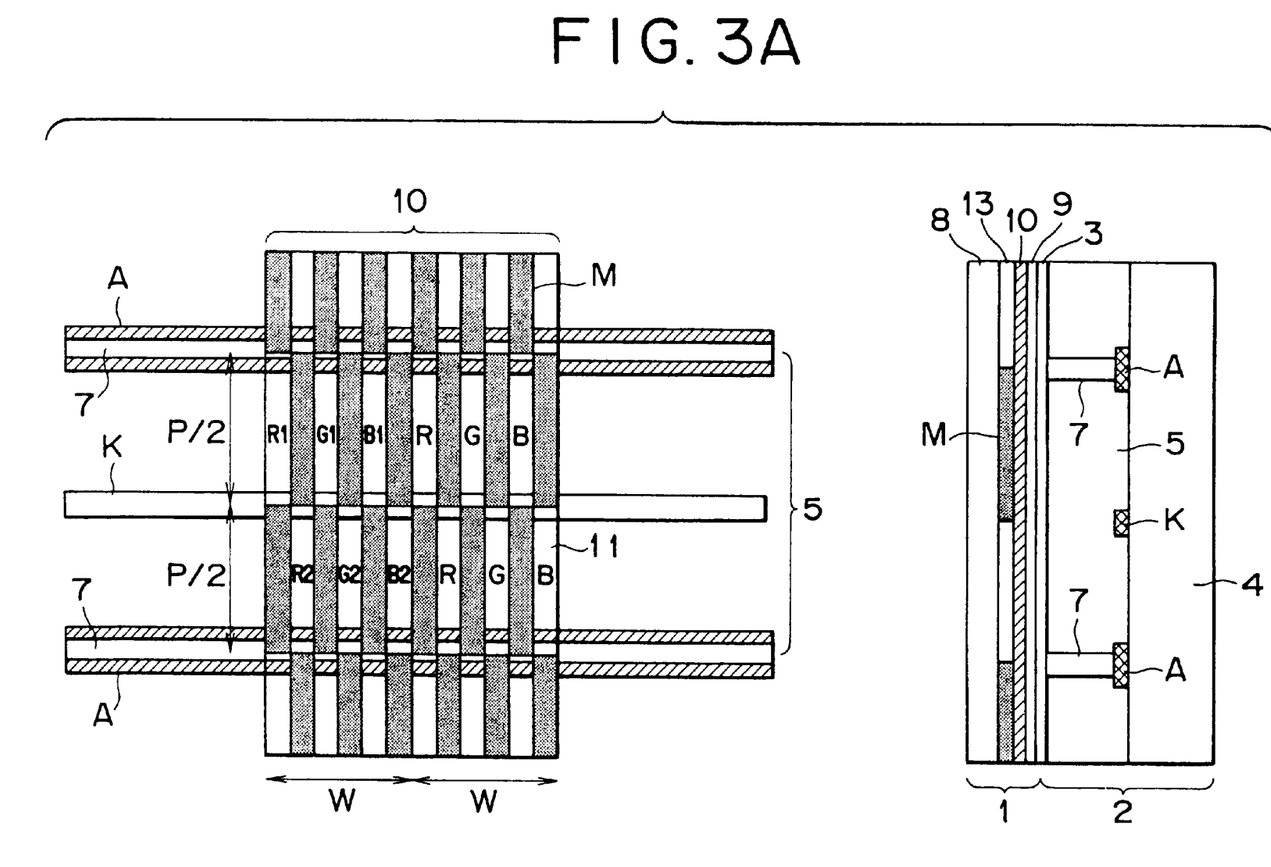
FIGS. 3A and 3B typically show a comparison between the embodiment and the reference example of the plasma addressed display system according to the present invention.
Figure 3B:
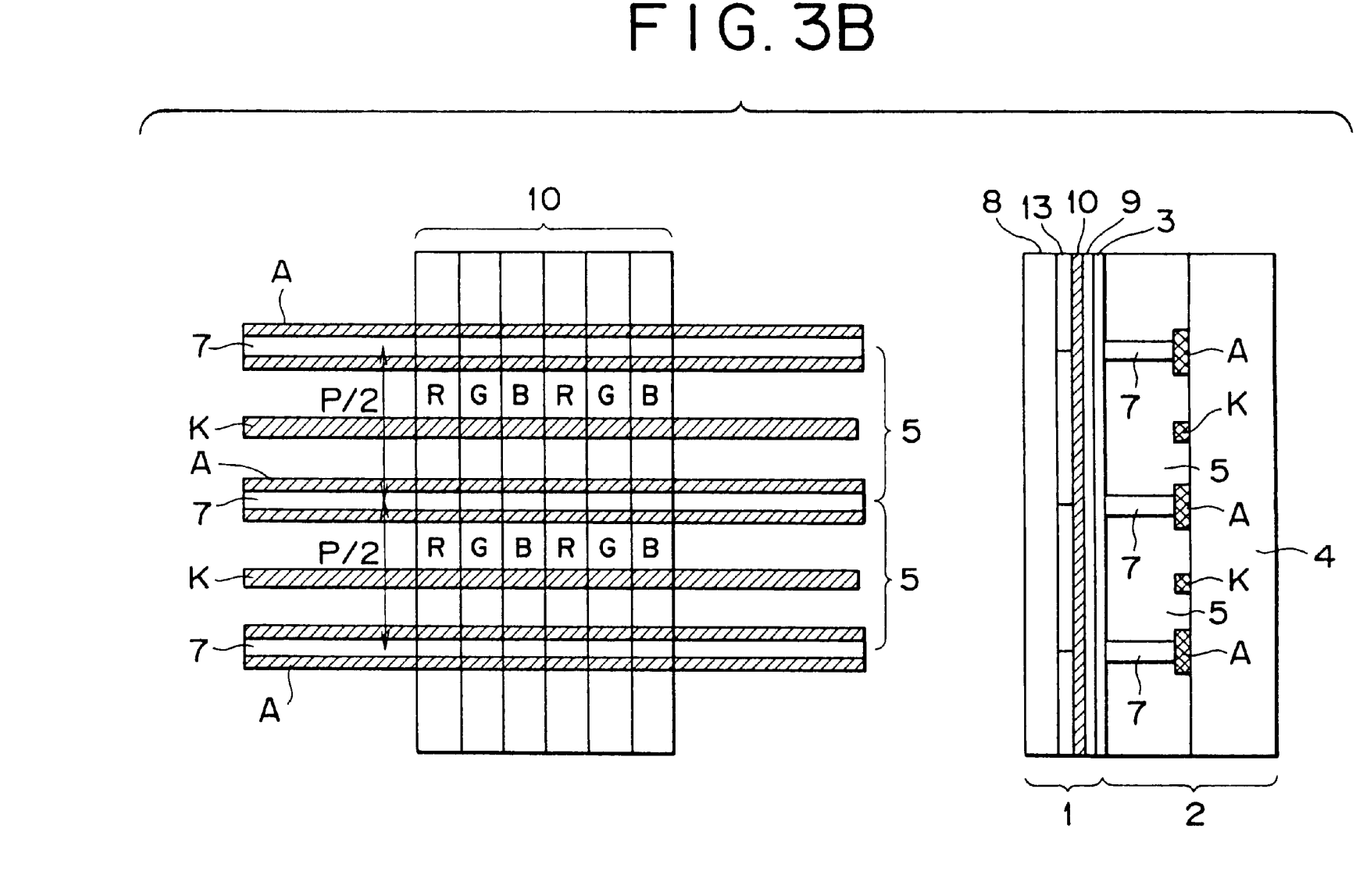

FIG. 3 represents a comparison between the embodiment of FIG. 1 and the reference example of FIG. 2 seen from a different point of view, in which FIG. 3A shows the embodiment and FIG. 3B shows the reference example. Supposing that the vertical resolutions in both of them are mutually equal and the array pitch of the discharge channels 5 is P in the embodiment, the array pitch of discharge channels 5 in the reference example needs to be set to P/2. Consequently, as shown in FIG. 3B, the occupied area rate of barrier ribs 7 and a cathode electrode K in each discharge channel 5 is rendered relatively greater, hence sacrificing the aperture ratio. Meanwhile in the embodiment, a sufficiently high aperture ratio can be secured as shown in FIG. 3A. In other words, when the vertical pitch is small under the condition that the vertical resolution is the same, the aperture ratio attainable in the embodiment is higher than that in the reference example even in consideration of the light shield with the mask, so that the brightness on the screen can be enhanced in proportion thereto. In the signal electrode, preferably the line width of the masked light shielding portion may be small to a certain extent not raising any problem relative to the wiring resistance, while the line width of the unmasked light transmitting portion may be large correspondingly thereto.

Figure 4A:
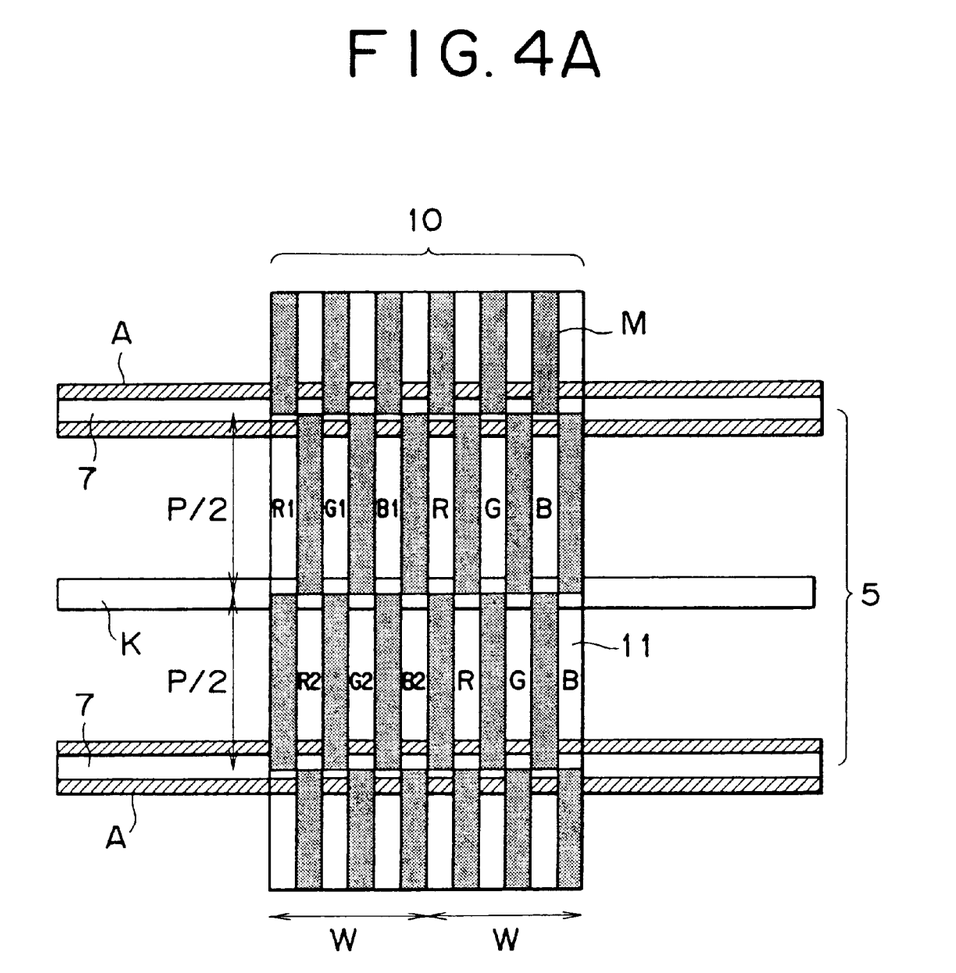
FIGS. 4A and 4B are partial plan views of other embodiments representing the plasma addressed display system of the invention.
Figure 4B:
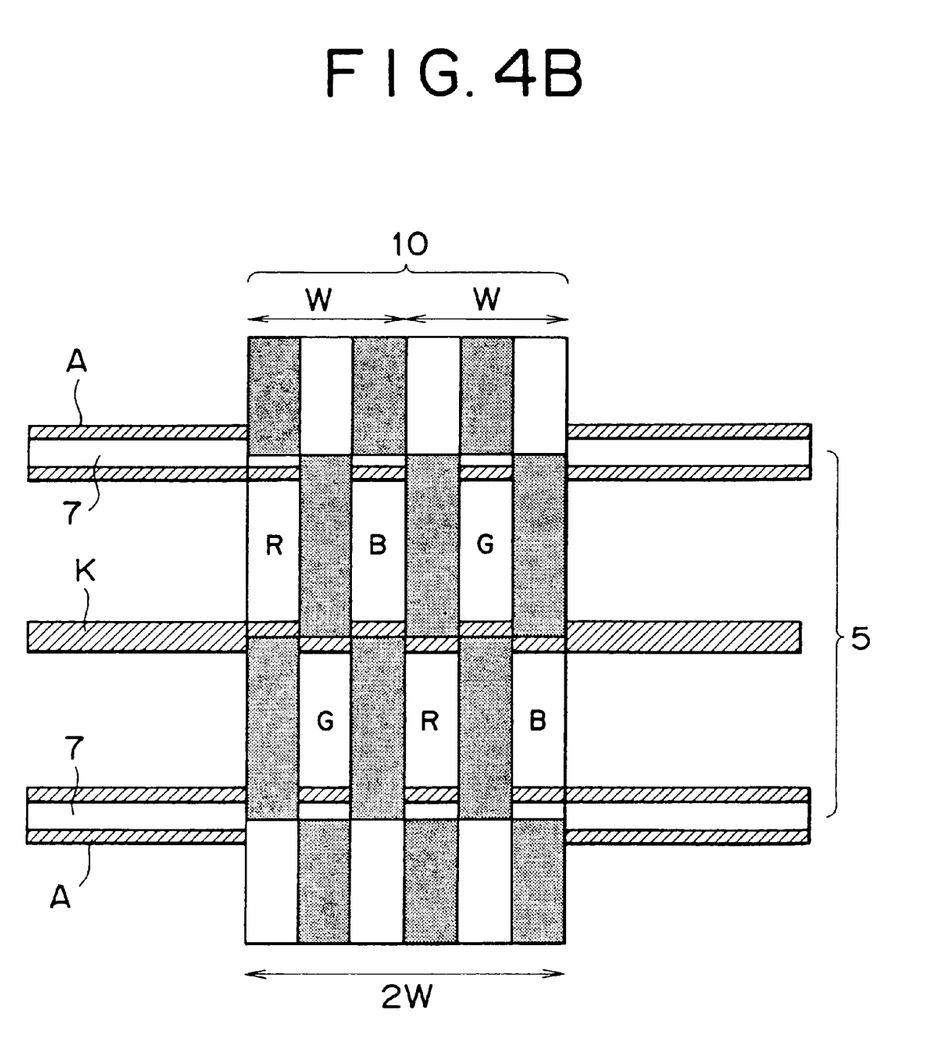

FIG. 4B shows another embodiment representing the plasma addressed display system of the present invention, and FIG. 4A shows the foregoing embodiment of FIG. 1 again for the purpose of comparison. As shown in FIG. 4B, the line width of each signal electrode 10 in this embodiment is double as compared with that in the foregoing embodiment of FIG. 4A. Therefore, the horizontal dimension of a pixel trio (R, G, B) is increased to 2W. However, as is obvious from the diagram, pixels R, G, B are included as a trio in one discharge channel within a width W which is determined by halving 2W. Since the horizontal dimension of each pixel trio can be regarded as W in driving, generation of false colors is not conspicuous. Accordingly, such a structure compatibly realizes improvements in both the horizontal resolution and the electric resistance of each signal electrode.

Figure 5A:
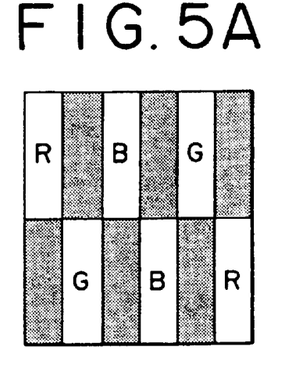
FIGS. 5A to 5G typically show various examples of a mask pattern used in the plasma addressed display system of the invention.
Figure 5B:
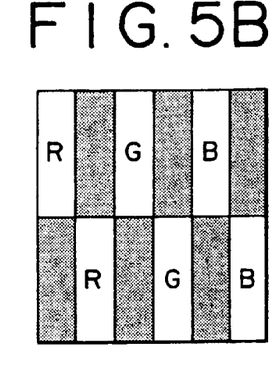
Figure 5C:
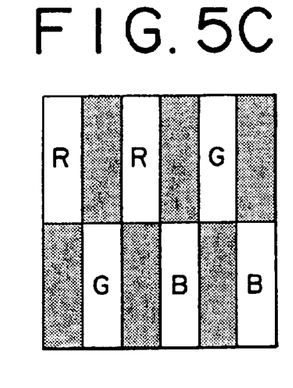
Figure 5D:
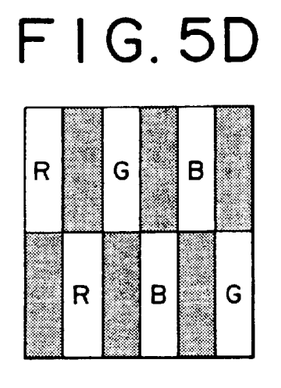
Figure 5E:
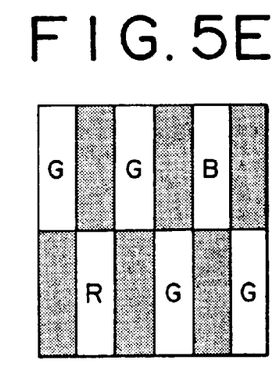
Figure 5F:
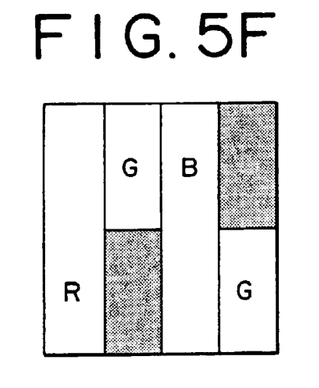
Figure 5G:
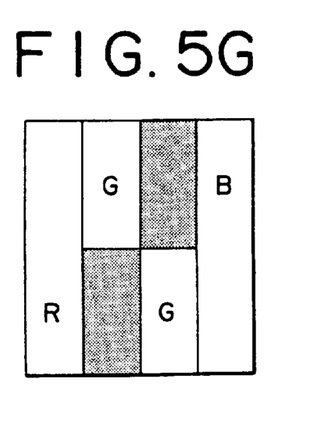

FIGS. 5A to 5G show various modifications of a mask pattern formed on a color filter. The present invention is not limited merely to the mask pattern of FIG. 1A alone, and any of the exemplary mask patterns shown in FIGS. 5A to 5G may be selected as well. It is further possible to employ a reflected symmetric pattern, an inverted symmetric pattern, a periodically equivalent pattern or a re-ordered RGB pattern of any example shown in FIG. 5. In the patterns of FIGS. 5F and 5G, the vertical resolution is raised with regard to the pixel G which is conspicuous particularly from a viewpoint of visual sensitivity, while the vertical resolutions regarding the other pixels R and B are not doubled. Naturally, the mask patterns of FIGS. 5F and 5G are embraced in the present invention.

Figure 6:
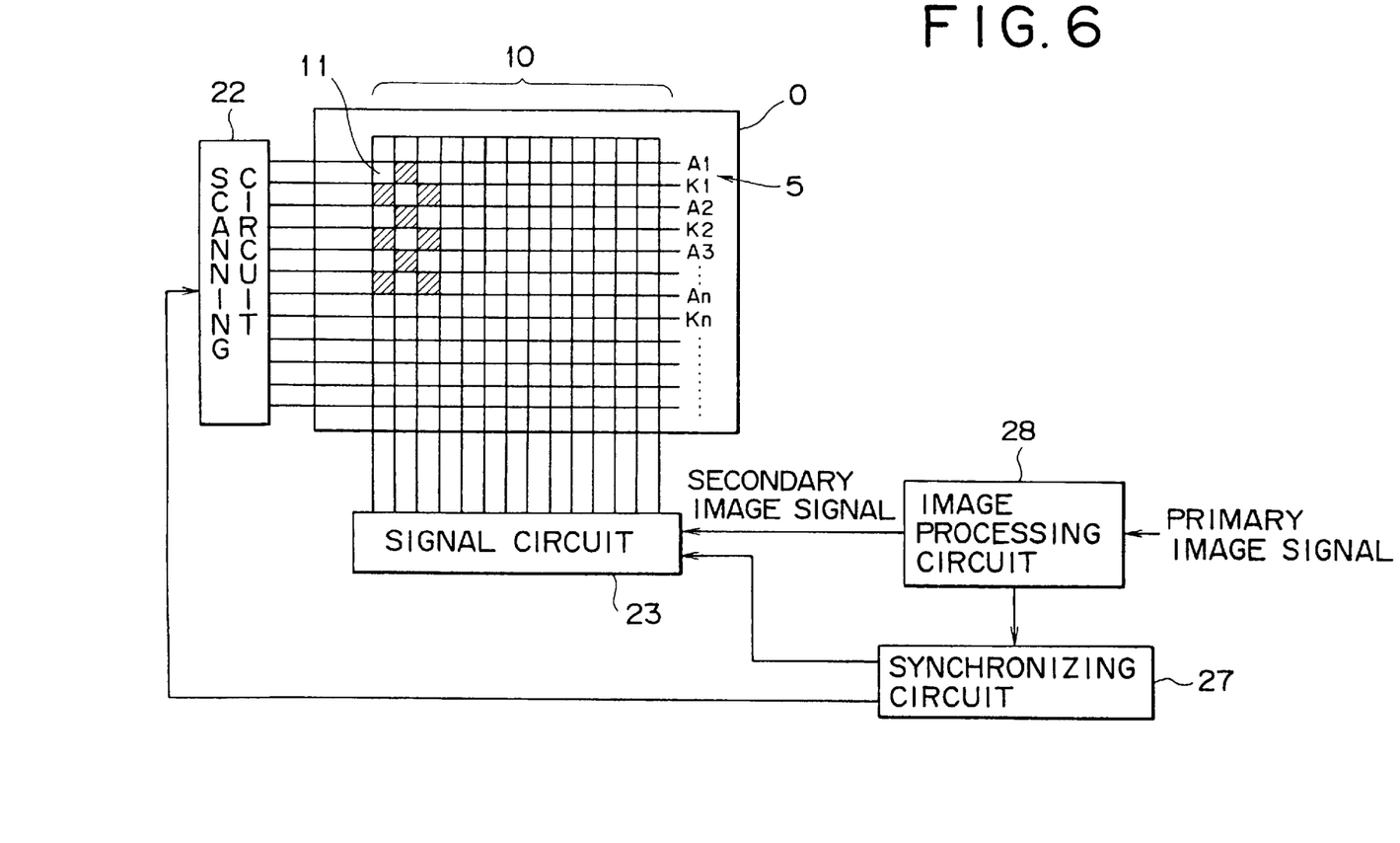
FIG. 6 is a block diagram showing the entire constitution of the plasma addressed display system of the invention including peripheral circuits.

FIG. 6 is a block diagram showing the entire construction of a plasma addressed display system inclusive of peripheral circuits. This plasma addressed display system fundamentally comprises a panel 0 having a flat structure, a scanning circuit 22 and a signal circuit 23. The panel 0 has a layered structure where a display cell and a plasma cell are mutually superposed as shown in FIG. 1. More specifically, an intermediate sheet composed of thin sheet glass or the like is interposed between the display cell and the plasma cell. The display cell has signal electrodes 10 in columns, while the plasma cell has discharge channels 5 in rows. Each discharge channel 5 comprises an intermediate cathode electrode K and anode electrodes A on both sides thereof. Pixels 11 are provided at intersections of the signal electrodes 10 and the discharge channels 5. As described, the pixels 11 are defined in a checked mask pattern, and the pixels 11 of two rows are allocated to the discharge channel 5 of one row. The pixels 11 are arrayed in the shape of a lattice to constitute a display screen. The scanning circuit 22 selects the discharge channels 5 sequentially to generate plasma discharges, in a manner to select the pixels of two rows simultaneously. Meanwhile the signal circuit 23 supplies an image signal to the signal electrodes 10 in synchronism with the discharge driving. A synchronizing circuit 27 is connected to both the scanning circuit 22 and the signal circuit 23, and generates a sync signal required for synchronizing the two circuits 22 and 23 with each other. An image processing circuit 28 is connected to the signal circuit 23 and serves to convert a primary image signal, which is supplied from an external apparatus, into a secondary image signal adapted for driving the panel 0. More precisely, the image processing circuit 28 first performs two-dimensional filtering of a primary image signal for applying the same to a predetermined mask pattern, and then supplies the result of such filtering as a secondary image signal to the signal circuit 23.

If the system is driven with the horizontal width of each pixel trio regarded as W in the structure of FIG. 4B, the total number of addressable pixels 11 is reduced to a half as compared with the structure of FIG. 4A, whereby the resolution in a physical sense is also lowered. However, in a general television signal or the like, mutually adjacent pictures are correlated in most cases, so that the picture quality is not deteriorated widely as far as a proper mask pattern is used. But in some images where such correlation is not expected as in a graphic display or the like outputted from a computer, there may occur an occasion where, depending on the display contents, a deterioration of the resolution in a physical sense causes a noticeable degradation in the image. For example, in a checked mask pattern, some oblique high frequency component included in the image signal is falsely colored. In the present invention, an image processing circuit 28 is provided therein to avoid such false coloring. This circuit 28 recognizes a display pattern in advance and executes proper two-dimensional filtering that conforms with the pattern to thereby eliminate the problem of false coloring. Although a checked mask pattern is taken here as an example, the disposition of the mask pattern itself is not so significant, and the essential importance resides in giving consideration to an image-signal digital sampling method and the characteristic of a low cutoff filter for the image signal.

According to the present invention, as mentioned, a lattice-shaped mask pattern for example is formed for striped signal electrodes in a plasma addressed display system, so that it becomes possible to allocate pixels of at least two rows to a discharge channel of one row, hence realizing an improvement at least in the vertical resolution without causing any harmful influence on the aperture ratio or the signal electrode resistance. Thus, manufacture of a high-resolution flat type plasma addressed display system is rendered possible at low cost.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A plasma addressed display system having a flat panel structure, comprising:

a display cell for displaying an image through modulation of incident light into outgoing light in accordance with an image signal, and a plasma cell joined to said display cell in respective planes, said plasma cell having discharge channels arrayed in rows and generating discharges in succession to scan said display cell line sequentially, said display cell having a plurality of signal electrodes arrayed in columns and forming pixels at intersections with said discharge channels, said display cell serving to apply an image signal in synchronism with the line sequential scanning and executing modulation of the incident light per pixel;

wherein pixels of a plurality of rows are defined in the discharge channel of one row, and the intersections of the signal electrodes, and a mask over portions of said signal electrodes so that the discharge channels are partially masked in conformity with a predetermined pattern, unmasked portions of said signal electrodes left at said intersections being assigned to the pixels of either row, and the image signal being applied simultaneously to the pixels of a plurality of rows by the discharge generated in the discharge channel of one row.

2. The plasma addressed display system according to claim 1, wherein said display cell has a liquid crystal layer for displaying an image.

3. The plasma addressed display system according to claim 1, wherein said predetermined pattern is a lattice pattern in which the masked light shielding portions and the unmasked light transmitting portions are arranged in a checked form.

4. The plasma addressed display system according to claim 3, wherein the line width of the masked light shielding portion is smaller than the line width of the unmasked light transmitting portion.

5. The plasma addressed display system according to claim 1, wherein each of said discharge channels has a pair of barrier ribs forming a row space, and a cathode electrode disposed between the barrier ribs; and the pixels of one row are defined between one barrier rib and the cathode electrode, while the pixels of the other row are defined between the other barrier rib and the cathode electrode.

6. The plasma addressed display system according to claim 1, further comprising an image processing means for previously filtering the image signal two dimensionally so as to adapt the image signal to said predetermined pattern.

7. A plasma addressed display, comprising:

a plasma discharge portion including:
 a first substrate;
 a plurality of discharge electrodes formed in parallel on said first substrate;
 a plurality of barrier walls formed in parallel to said plurality of discharge electrodes to define discharge chambers, said discharge chambers each including at least a pair of said discharge electrodes;
 an ionizable gas in said discharge chambers which generates a plasma upon application of a discharge voltage between said discharge electrodes of a discharge chamber;

an intermediate layer atop said barrier walls;

an electro-optical portion on said intermediate layer opposite said plasma discharge portion, said electro-optical portion including:
 a second substrate spaced from said intermediate layer;
 an electro-optical material between said second substrate and said intermediate layer;
 signal electrodes on said second substrate, said signal electrodes extending transverse to said discharge chambers to define pixels at intersections of said signal electrodes with said discharge chambers; and
 a mask of a predetermined pattern applied on said signal electrodes to cover portions of said signal electrodes, said mask leaving portions of said signal electrodes uncovered to define rows of pixels, a plurality of said rows being defined by said mask at each of said discharge chambers.

8. A plasma addressed display as claimed in claim 7, wherein said discharge electrodes includes a first discharge electrode in each of said discharge chambers, said mask covering portions of said signal electrodes to over said discharge chamber from an edge of said discharge chamber to said first discharge electrode and leaving uncovered portions of said signal electrodes from over said first discharge electrode to an opposite edge of said discharge chamber.

9. A plasma addressed display as claimed in claim 7, wherein said mask is a checkered pattern covering said signal electrodes.

10. A plasma addressed display as claimed in claim 7, wherein said mask covers a portion of a signal electrode over a discharge chamber but leaves uncovered an adjacent signal electrode over a same one of said discharge chamber.

* * * * *